June 7, 1960  R. B. JACOBS ET AL  2,939,312
CONTINUOUS FLASH POINT MONITOR
Filed Nov. 27, 1956  3 Sheets-Sheet 1

INVENTORS:
Robert B. Jacobs
Joseph C. Rhodes
Dominic Daniel LoGiurato
BY Everett A. Johnson
ATTORNEY INVENTORS:
Robert B. Jacobs
Joseph C. Rhodes
Dominic Daniel LoGiurato

ATTORNEY

2,939,312

CONTINUOUS FLASH POINT MONITOR

Robert B. Jacobs, Homewood, Joseph C. Rhodes, Park Forest, and Dominic D. Lo Giurato, Oak Lawn, Ill., assignors to Standard Oil Company, Chicago, Ill., a corporation of Indiana Filed Nov. 27, 1956, Ser. No. 624,596

7 Claims. (Cl. 73—36)

This invention relates to the determination of the flash point of liquids. The invention is more particularly directed to an improved apparatus for automatically determining and recording the flash point temperature of a continuous stream of liquid hydrocarbons.

In the production of certain commercial hydrocarbon products, it is desirable to maintain the flash point within specified limits and for safety should be above a prescribed specification. Although the flash point may be measured from individual samples taken from a plant stream, it is desirable to monitor the flash point temperature continuously to enable the operator to control the flash point of the product during its manufacture, distillation, and/or blending. Accordingly there has long been a need for continuously measuring and indicating the flash point of a volatile liquid but it is also desirable to simulate as closely as possible the standard test methods for the determination of flash points, one such method being the Tag Closed Cup which is conventionally employed in many analytical and control laboratories.

The Tag Closed Cup test operates on a batch sample of liquid, the sample being heated at a prescribed rate and a test flame of precise size being inserted periodically into the vapor above the sample. The liquid temperature at which the vapor from the batch sample flashes is designated as the "flash point." Such a method requires close supervision by an experienced operator, it can only be made on a batch sample basis and must be repeated until the operator is convinced that he has obtained a true indication of the flash point.

It is therefore a primary object of this invention to provide a flash point apparatus adapted to monitor continuously a flowing stream of a volatile liquid. Another object of the invention is to provide a flash point indicating system which has an accuracy that is comparable to the best of the standard methods. Still another object is to provide a system which is fully automatic and which does not require any special skill of the operator. Another object of the invention is to provide a flash point apparatus which gives a reliable flash point indication of flash point on a flowing stream of liquid which can be correlated with flash point determined by batch sample methods such as the Tag Closed Cup method.

These and other objects of the invention will become apparent as our description thereof proceeds.

Briefly, according to our invention, we provide an apparatus wherein a metered sample is introduced by a proportioning pump, adjusted to a selected uniform temperature, passed through a heater, and thence into a flash cup of low heat capacity.

Air is metered into the sample stream between the heater and the flash cup at a fixed rate and a shield within the cup prevents splashing of the sample. The flash cup is provided with two sparking electrodes, a pair of differential thermocouples for detecting the occurrence of the flash, a conduit for introducing an auxiliary flushing jet of air above the normal liquid level therein, and a drain for continuously withdrawing the flowing sample.

At the beginning of a test, the heater is turned on and the temperature of the metered sample entering the cup begins to rise. The sample temperature is measured continuously with a thermocouple located in the liquid in the bottom of the flash cup, the heating of the sample being continued until the concentration of vapors in the chamber is enough to cause a small propagated explosion. This explosion is detected by a differential thermocouple, one end of which is in the liquid sample and the other end is in the vapor space.

The differential thermocouple actuates a self-locking relay which starts a timer motor which in turn operates a switch controlling the heater. The switch also opens a solenoid valve to allow flushing air to blast into the flash cup. After about two minutes, the timer motor again operates the switch to turn the heater back on, close the blasting air solenoid valve, and begin a new run.

There is no attempt to control the temperature of the heater but merely to detect the temperature at which the sample flashes during the generation of vapors by the uniform heating by the liquid and when exposed to the hot spark between the electrodes. During the air blasting and the time that the heater is off, the temperature of the liquid will of course fall. Accordingly, the temperature record is saw-toothed and the peak of this record is the flash point of the sample.

We have found that this procedure gives good correlation between the standard Tag Closed Cup tests and the flash point indication obtained by the instrument since the procedure for running the standard test is simulated by the apparatus but permits a continuous monitoring of the flowing stream.

Further details of our invention are illustrated by the accompanying drawings wherein.

Figure 1:
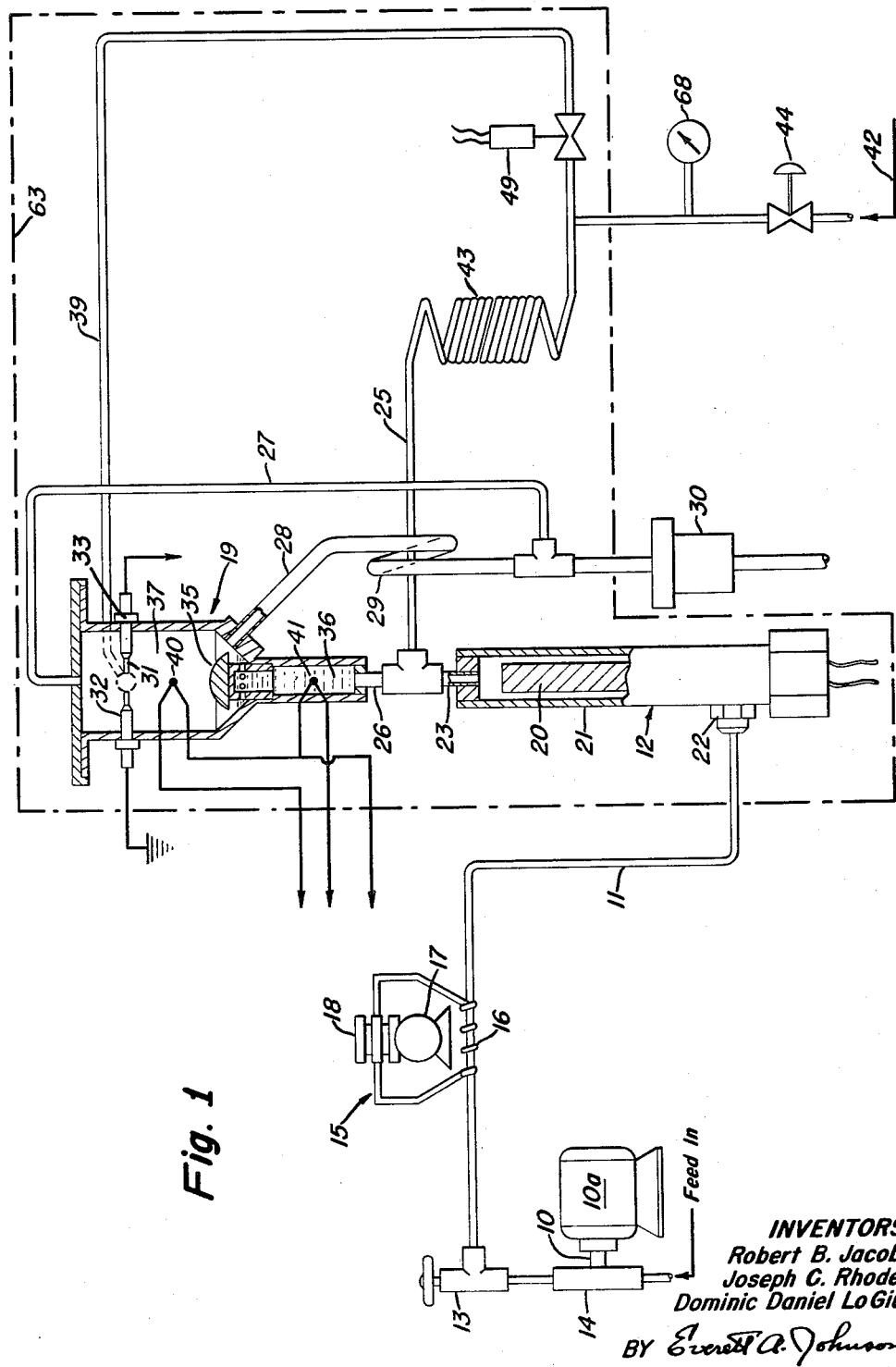
Figure 1 is an elevation schematically showing the general assembly of one embodiment of our own invention.
Figure 2:
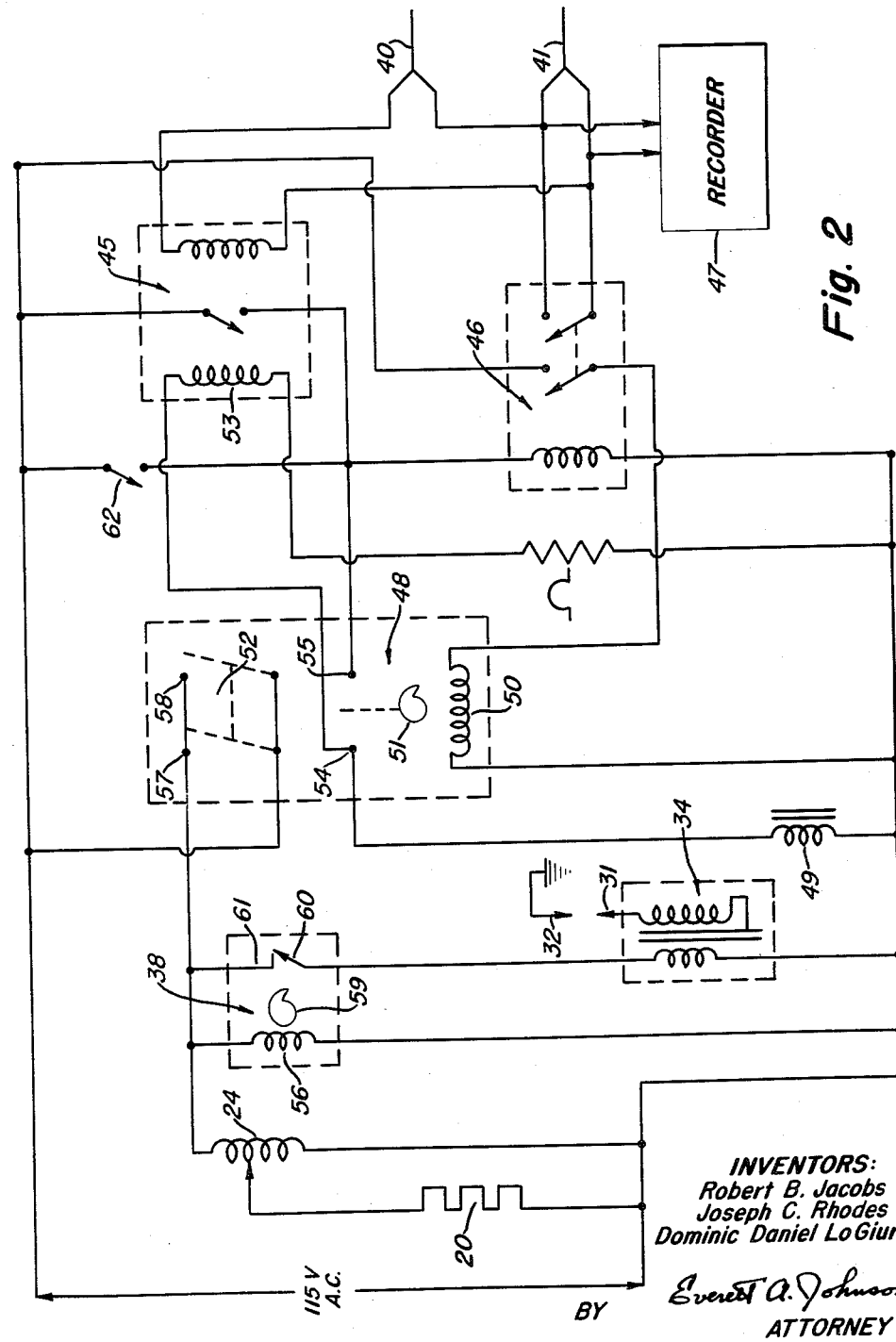
Figure 2 is a second diagram for use with the apparatus of Figure 1.

Referring to the drawings, the sample is fed into the instrument continuously by a proportioning pump 10 which discharges into feed line 11 leading to the heater 12. The pump 10 is suitably of the adjustable stroke type set to deliver about 35 cc. per minute into line 11. A relief valve 13 is installed on the outlet side of the pump check valve 14 to prevent the sample from being forced by line pressure straight through the check valve assembly.

The temperature of the sample in line 11 is reduced by the refrigeration unit 15 and the cooled sample then passes into the heater 12 where the temperature is raised gradually. The refrigeration unit 15, includes a cooling coil 16 on inlet line 11, a compressor 17, and a radiator 18. It has been found that bringing the incoming stream to a temperature well-below its flash point assures adequate cooling of the flash test assembly 19 between each cycle; also more accurate flash points can be run if the incoming stream is at least 40° F. below the flash point before the controlled progressive heating of the stream takes place.

The heater 12 includes a cartridge 20 mounted within a cylindrical shell 21 having an inlet 22 and an outlet 23. The power to the heater 12 is controlled by the voltage controller 24.

Combustion air is introduced via line 25 into the preheated liquid flowing in line 26 from the heater 12 into the test chamber assembly 19. The air, vapor, and liquid pass into the test chamber 19 and then into a drain system including the overhead vapor line 27, the liquid draw-off line 28 having the loop 29, and the explosion-proof drain 30. The loop 29 traps a pool of liquid and provides a pressure drop which assures the flow of vapors and air upwardly through the flash chamber 19 across the sparking electrodes 31 and 32 and into the liquid drawoff line 28 between the loop 29 through vapor line 27 and the explosion-proof drain 30.

The tips of electrodes 31 and 32 are set about %4 inch apart. Electrode 31 has a nylon insulator 33 and is connected to the high voltage transformer 34. The other electrode 32 is not insulated and is the ground for the high voltage spark. The electrodes 31 and 32 should be spaced a substantial distance from the splash shield 35 so that the spark will not jump to or from the electrodes if they become coated with an insulator during operation.

The test chamber 19 is made of aluminum and is thin-walled to have a low heat capacity. The lower portion of the chamber 19 includes a well or cup 36 into which the stream of liquid, vapor, and air is introduced. The shield 35 is disposed across the upper end of the well 36 and permits the in-flow of the stream but prevents splashing.

Connected to the chamber 19 are the supply line 26 discharging into the well or cup 36, the liquid draw-off line 28, and the vapor vent line 27 which communicates with the vapor space 37 in the upper part of the chamber 19. Also connected to the vapor space 37 of the assembly 19 are the two electrodes 31 and 32, one being grounded as described above and the other being connected to transformer 34. Purge air is introduced via line 39. The vapor space thermocouple 40 and the liquid space thermocouple 41, complete the flash test assembly 19. These thermocouples are copper-constantan.

Air is supplied to the test chamber 19 via liquid line 26 and conduit 25, air being furnished from a pressure source 42 via capillary 43 and pressure regulator 44. The capillary 43 may comprise a single strand of copper capillary with I.D. of 0.031" and length of about 7 ft. It allows a flow of 810 cc./min. of air into the test chamber 19 when a pressure of 8.0 p.s.i. is maintained by the regulator 44. This flow gives the best correlations between instrument indications of flash point and results obtained by the Tag Closed Cup test as described in the ASTM manual.

The air-vapor mixture in the upper part 37 of the test chamber 19 is exposed to a high voltage spark across the electrodes 31 and 32 every two seconds. When the liquid reaches a certain temperature (measured by the liquid space thermocouple 41), the air-vapor mixture becomes explosive. The spark ignites this mixture causing a small explosion whereby the thermocouple 40 in the vapor space 37 above the cup 36 in the chamber 19 is heated 200°–300° F. above the temperature of the liquid surrounding the thermocouple 41 in the well 36 of the flash test assembly 19.

The resultant thermocouple voltage is used to actuate a sensitive self-locking single-pole single-throw normally open relay 45 which in turn actuates a double-pole single-throw normally open relay 46 which shorts the thermocouple 41 in the liquid which is connected to the recorder 47. This drives the recorder pen downward to give a temperature record which is a saw-toothed curve and the peak of the curve is the flash point of the sample.

The cycle timer 48 begins a two minute cooling cycle during which the heater 12 and the spark timer 38 are turned off, the contacts of the relay 45 are opened, and air is blasted into the test chamber 19 via air solenoid valve 49 and line 39. The blast of air into the chamber 19 after an explosion occurs serves the purposes of removing gases from the vapor space 37 and helps to cool the walls of the chamber 19 in preparation for the next cycle. This air is introduced at a point level with the two electrodes 31 and 32 through a fitting which is 90° from the diametrically opposed electrodes, the flow of flushing air being about 2000 cc./minute. After the two minute period of the cycle timer 48, the heater 12 is turned on, the pen of the recorder 47 is released, and another cycle is begun.

The cycle timer 48 comprises a 0.5 r.p.m. motor 50, a cam 51 and a double pole-double throw microswitch 52. The air solenoid valve 49 and reset solenoid 53 of the relay 45 are connected through one of the normally closed contacts 54 and the actuating winding of the heavy duty relay 46 is connected through the other normally closed contact 55. The spark transformer 34, spark timer motor 56, and the cartridge heater 20 are connected through the normally open contacts 57 and 58.

The spark timer 38 comprises the 30 r.p.m. synchronous motor 56, a cam 59, and a pair of breaker points 60—61. The contact is made and broken every two seconds and the duration of the spark across the electrodes 31 and 32 is about 0.25 second. The transformer 34 delivers the spark across the electrodes 31 and 32, the primary 34a of the transformer 34 being turned on and off by the spark timer 38. The transformer 34 operates on 115 volts A.C. and has an output of 5000 volts.

To prevent the heater 12 from remaining on when the temperature of a liquid sample accidentally goes high enough to produce vapor sufficiently rich to be above its upper explosive limit, a normally open thermoswitch 62 is mounted near the heater 12 and initiates a two minute cooling cycle whenever the temperature of the sample stream exceeds the range of the instrument by more than 10° F. This prevents burning out of the heater 12 if the sample stream is interrupted and allows the heater 12 and chamber 19 to cool in the event the air-vapor mixture in the vapor space 37 goes above the explosive limit. This also prevents the instrument from remaining inoperative when products of very low flash point such as gasoline are followed by products with flash points within the range of the instrument.

Figure 3:
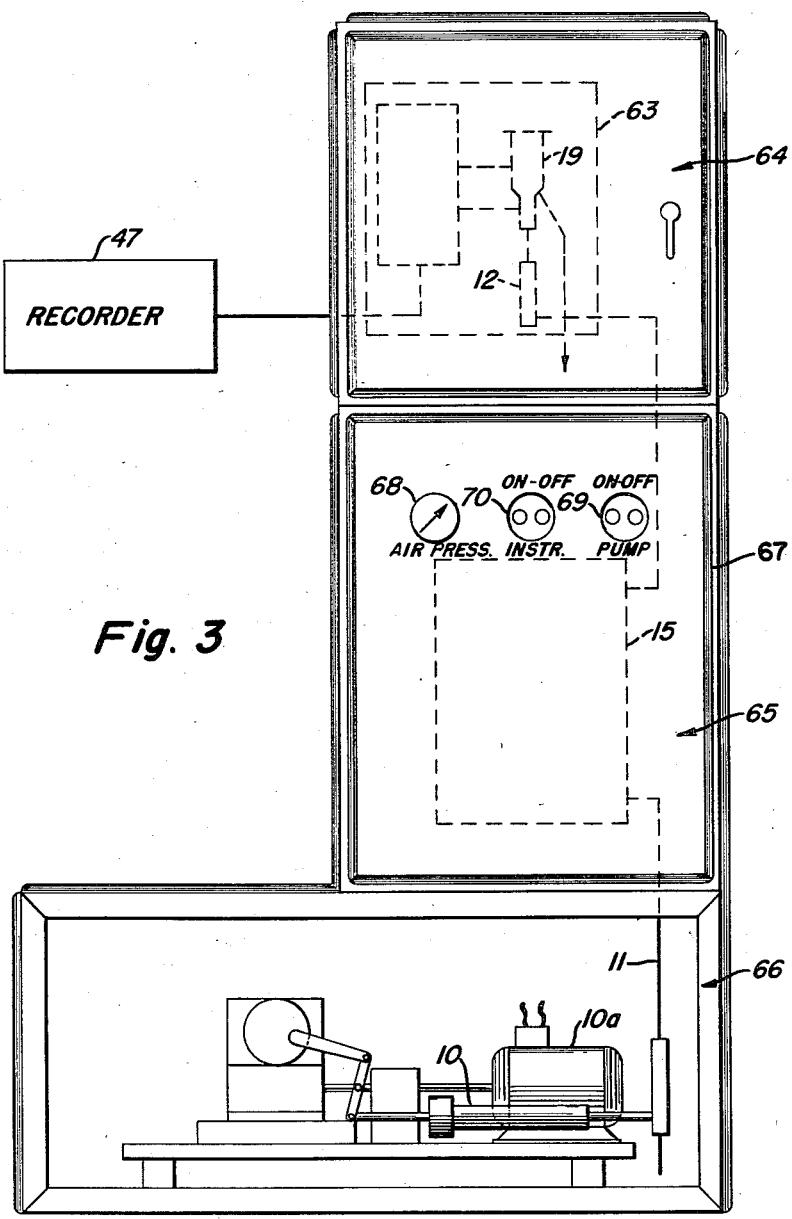
Figure 3 is an elevation of the assembly with some components shown in phantom.

Referring to Figures 1 and 3, an explosion-proof case 63 is disposed in the upper compartment 64 of the cabinet in Figure 3. This case 63 houses the flash test assembly 19, the heater 12, cycle timer 48, heater controller 24, transformer 34, spark timer 28, relays 45 and 46, and air capillary 43 as schematically illustrated in Figure 1.

The refrigeration unit 15 is disposed within compartment 65 and the pump 10 is mounted within the lower-most compartment 66.

Each of compartments 64, 65 and 66 may be enclosed with the cover 67 of compartment 65 comprising the instrument panel. This includes an air pressure gauge 68 which indicates the pressure setting of the pressure regulating valve 44 and under the conditions described will read at about 8.0 p.s.i. Switch 69 controls the pump motor 10a and the power to the instrument is controlled by on-off switch 70. The recorder 47, calibrated to read directly in degrees Fahrenheit with copper-constantan thermocouple 41 may be mounted remotely in a nonhazardous area or may be supported by the cabinet when the sample is delivered to the instrument remote from a hazardous area.

It should be understood that the continuous flash point measurement is ordinarily applied to only an increment of a much larger flowing stream and that the information on flash point can be used to automatically control process conditions to produce a stream having the desired flash point.

In a typical installation, the apparatus is placed adjacent or on the processing unit to be monitored. To operate the instrument, it is only necessary to connect the utilities, the sample line, and the drain. The operation is completely automatic and the results obtained agree with the Tag Closed Cup flash point values to about ±20° F. over a range of 85° F. to 150° F.

Although our invention has been descriebd in terms of a preferred embodiment of the apparatus, it should be understood that this is by way of illustration and that the invention is not necessarily limited thereto. Alternative apparatus components and operating techniques will become apparent to those skilled in the art in view of our invention. Accordingly, modifications are contemplated without departing from the spirit of the invention.

What we claim is:

1. In a flash monitoring apparatus for use on a continuously flowing liquid stream, the improvement which comprises an enclosed flash chamber of low heat capacity, controllable spark ignition means within said flash chamber, an inlet to said flash chamber, an overflow outlet means communicating with said flash chamber and having means for maintaining a pool of liquid in said overflow outlet means, vapor vent means communicating with said flash chamber at a high point therein and discharging into said overflow outlet means at a point below said pool in said outlet means, conduit means carrying the liquid under test and connected to said flash chamber inlet means, a heating means having a capacity adapted to raise the temperature of the liquid sample from said conduit at least about 40° F., means for introducing combustion air into said flash chamber, said vent means continuously drawing gasiform fluids from said flash chamber thereby causing flow of vapors and combustion air across the spark ignition means and discharging from said flash chamber into said overflow drain, control means responsive to the occurrence of a flash in said flash chamber, said control means being adapted to terminate the heating by said heater when a flash occurs, refrigeration means on said conduit means adapted to flow cooled sample liquid into said flash chamber, said refrigeration means being adapted to lower the temperature of the flash chamber after a flash has occurred, and temperature-responsive means within said flash chamber continuously indicating the temperature of the liquid therein, the peak temperature recorded for any cycle being the flash point of the liquid under test.

2. In a flash-responsive apparatus of the type wherein a liquid sample is continuously flowed through a test flash chamber and evolved vapors are subjected to an ignition spark in the presence of introduced combustion air, the occurrence of a flash is sensed, and the temperature of the liquid at the time of the flash is recorded, the improvement which comprises a flash chamber having a liquid space and a vapor space, heater means for heating the sample en route to said flash chamber, an overflow drain from said flash chamber having flow-restricting means for producing a pressure drop, vent means from said flash chamber communicating with the said overflow drain downstream of said flow-restricting means, said vent means providing for flow of gasiform fluids across the ignition spark means within the flash chamber, differential thermocouple means having one junction in the vapor space and another junction in the liquid space within said flash chamber, heater control and temperature sensing circuit means including said differential thermocouple means and said heater means, relay means in said circuit means, said relay being actuated by the temperature differential between said junctions produced upon the occurrence of a flash in said flash chamber, said relay means cutting off the heater means, and means for refrigerating the flowing liquid sample whereby the flow of cooled liquid sample reduces the temperature within said liquid space.

3. In a flash testing apparatus, a flash chamber, a cup within said chamber, first conduit means exterior of said chamber supplying a continuous stream of test liquid to said cup, heater means on said first conduit means for heating said stream, second conduit means discharging the heated stream to said cup, an overflow drain from said cup, wall means defining an enclosed vapor space above said cup and above said overflow drain, spark ignition means within said vapor space, vent means extending between said enclosed vapor space and said drain whereby gasiform fluids flow upwardly across said spark ignition means in discharging from said chamber, a first thermocouple within said vapor space, a second thermocouple within said cup, said thermocouples being connected in an electrical circuit so that a differential temperature measurement between said thermocouples produces a signal, a recorder for the said second thermocouple, relay means actuated by said signal, said relay being adapted to disconnected said heater for a preselected period of time, and refrigeration means on said first conduit means whereby a relatively cool sample liquid stream is fed to the cup and the peak recorded temperature is an indication of the flash point of the liquid.

4. An apparatus for continuously indicating the flash point of a flowing stream of liquid which comprises a flash chamber, a sample cup within said chamber, a first conduit supplying test liquid to the apparatus, a pump on said conduit, refrigeration means cooling the fluid being pumped through said conduit, electrical heater means for heating the precooled stream supplied by said conduit, second conduit means supplying the heated liquid from said heater means to said cup, third conduit means supplying combustion air to the said cup via said second conduit means, the combined stream of heated liquid and combustion air flowing upwardly through said cup, wall means defining a vapor space above said cup, an overflow drain from said cup, a loop in said drain providing a liquid trap, said loop being disposed in a substantially vertical plane, a vent line from said vapor space communicating with said drain downstream of said loop, said drain discharging into an explosion-proof drain trap, differential thermocouple means having one junction in said vapor space and having a second junction in said cup, said differential thermocouple means being connected to an electrical control circuit including said electrical heater, relay means in said circuit controlling the power input to said heater, blasting air supply means discharging into said vapor space, solenoid valve means controlling the flow of blasting air through said blasting air supply means, a pair of sparking electrodes within said vapor space, and spark timer means in said circuit, whereby the occurrence of a flash within said vapor space produces a differential temperature between said thermocouple means with the result that the relay means is actuated and the heater is turned off, the blasting air solenoid valve is opened, and the peak temperature sensed by the thermocouple junction in the said cup is recorded as the flash point of the liquid flowing through the apparatus.

5. An apparatus for continuously indicating the flash point of a flowing stream of liquid which comprises a flash chamber, a sample cup within said chamber, a conduit supplying test liquid to the apparatus, a pump on said conduit, electrical heater means adapted to raise the temperature of the stream supplied by said conduit, second conduit means supplying the heated liquid to said cup, third conduit means supplying combustion air to the said cup, the co-mingled heated liquid and combustion air flowing upwardly through said cup, wall means defining a vapor space above said cup, and overflow drain from said cup, a liquid trap in said drain, a vent line from said vapor space communicating with said drain downstream of said liquid trap, differential thermocouple means having one junction in said vapor space and having a second junction in said cup, said differential thermocouple means being connected to an electric circuit including said electrical heater whereby a differential temperature between said junctions produces a signal, relay means in said circuit controlling the power input to said heater, said relay means being actuated by said signal, a pair of sparking electrodes within said vapor space, and spark timer means in said circuit whereby the occurrence of a flash within said vapor space produces a differential temperature which is sensed by said differential thermocouple means to produce the signal for actuating the relay means, refrigeration means cooling the liquid flowing in said first conduit means whereby the flash cup is rapidly cooled following a flash determination, means for recording continuously the temperature sensed by the thermocouple junction in the said cup being indicative of the flash point of the sample flowing through the apparatus.

6. An apparatus for continuously indicating the flash point of a flowing stream of liquid which comprises a flash chamber, a sample cup within said chamber, first conduit means supplying test liquid to the apparatus, refrigeration means cooling the liquid being supplied through said conduit means, electrical heater means for heating the cooled liquid, second conduit means transferring the heated liquid from said heater means to said sample cup, conduit means supplying combustion air to the said cup via said second conduit means, the combined stream of heated liquid and combustion air flowing upwardly through said cup, wall means defining a closed vapor space above said cup, a pair of sparking electrodes within said vapor space, spark timer means controlling said electrodes, overflow drain means from said cup, a loop in said drain providing a liquid trap, a vent line from said closed vapor space communicating with said drain downstream of said loop, vapors and gases being drawn upwardly through the said vapor space and through said vent line into said drain, differential thermocouple means having a first thermocouple in said vapor space and having a second thermocouple in said cup, said differential thermocouple means being connected in an electrical circuit with said second thermocouple sensing the temperature of the liquid in said cup, and said differential thermocouple means producing a signal upon the occurrence of a flash within said vapor space, and relay means in said circuit responsive to such signal whereby the occurrence of a flash within said vapor space results in a differential temperature which produces the signal to actuate the relay means whereby the heater is turned off and the second thermocouple is cut from the recording circuit, the recorded peak temperature sensed by said second thermocouple in said sample cup being a measure of the flash point of the liquid.

7. The apparatus of claim 3 wherein said cup is of low heat capacity and wherein said drain is provided with low-restricting means.

References Cited in the file of this patent

UNITED STATES PATENTS

| | | |
|---|---|---|
| 1,583,600 | McBurney | May 4, 1926 |
| 2,627,745 | Matteson | Feb. 10, 1953 |
| 2,746,285 | Greanias | May 22, 1956 |
| 2,746,286 | Greanias et al. | May 22, 1956 |

UNITED STATES PATENT OFFICE

CERTIFICATE OF CORRECTION

Patent No. 2,939,312                                        June 7, 1960

Robert B. Jacobs et al.

It is hereby certified that error appears in the printed specification of the above numbered patent requiring correction and that the said Letters Patent should read as corrected below.

Column 6, line 7, for "disconnected" read -- disconnect --; column 8, line 17, for "low-restricting" read -- flow-restricting --.

Signed and sealed this 8th day of November 1960.

(SEAL)
Attest:

KARL H. AXLINE                                                   ROBERT C. WATSON
Attesting Officer                                            Commissioner of Patents